(12) United States Patent
Garud et al.

(10) Patent No.: US 7,890,941 B1
(45) Date of Patent: Feb. 15, 2011

(54) BINARY PROFILE INSTRUMENTATION FRAMEWORK

(75) Inventors: Chandrashekhar Garud, Mountain View, CA (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1245 days.

(21) Appl. No.: 11/270,938

(22) Filed: Nov. 10, 2005

(51) Int. Cl.
*G06F 9/45* (2006.01)
*G06F 9/44* (2006.01)
*G06F 7/38* (2006.01)

(52) U.S. Cl. .................. 717/158; 717/130; 717/155; 717/156; 712/228

(58) Field of Classification Search .................. None
See application file for complete search history.

(56) References Cited

U.S. PATENT DOCUMENTS

| | | | | |
|---|---|---|---|---|
| 6,820,251 | B1 * | 11/2004 | Dwyer | 717/130 |
| 7,120,906 | B1 * | 10/2006 | Stephenson et al. | 717/158 |
| 7,676,796 | B2 * | 3/2010 | Talyansky | 717/130 |
| 2004/0163053 | A1 * | 8/2004 | Snider | 716/3 |
| 2005/0071515 | A1 * | 3/2005 | DeWitt et al. | 710/1 |
| 2006/0004996 | A1 * | 1/2006 | Gonion | 712/241 |

OTHER PUBLICATIONS

"Inferring annotated types for inter-procedural register allocation with constructor flattening", Amtoft et al., Jan. 2003, pp. 86-97, <http://delivery.acm.org/10.1145/610000/604186/p86-amtoft.pdf>.*

"Balancing register pressure and context-switching delays in ASTI systems", Shivshankar et al., Sep. 2005, pp. 286-294, <http://delivery.acm.org/10.1145/1090000/1086335/p286-shivshankar.pdf>.*

"A fast, memory-efficient register allocation framework for embedded systems", Thammanur et al., Nov. 2004, pp. 938-974, <http://delivery.acm.org/10.1145/1040000/1034776/p938-thammanur.pdf>.*

Brad Calder, et al., "BitRaker Anvil: Binary Instrumentation for Rapid Creation of Simulation and Workload Analysis Tools", Paper, Proceedings of the Global Signal Processing (GSPx) Conference, Sep. 2004, 6 pgs.

Vijay Janapa Reddi, et al., "PIN: A Binary Instrumentation Tool for Computer Architecture Research and Education", Paper, Workshop on Computer Architecture Education held in conjunction with the 31$^{st}$ International Symposium on Computer Architecture, Munich, Germany, Jun. 19, 2004, 8 pgs.

* cited by examiner

*Primary Examiner*—Thuy Dao
(74) *Attorney, Agent, or Firm*—Osha • Liang LLP

(57) ABSTRACT

Techniques for reliable binary instrumentation based on annotation information are described. A binary file that comprises a code section representing the executable code of a computer program is accessed. The binary file also comprises annotation information that indicates the boundaries of one or more portions of the computer program. Accurate data flow information and control flow information may be generated based on the annotation information included in the binary file. The binary file is instrumented by inserting a set of instrumentation code at one or more points in the code section of the computer program. The one or more points are determined based on the data flow information and the control flow information.

28 Claims, 7 Drawing Sheets

INSTRUMENTATION CODE WITHIN A BASIC BLOCK THAT USES A FREE REGISTER

UNINSTRUMENTED BINARY FILE

FORMAT OF PROFILE COUNTERS SECTION

BINARY PROFILE INSTRUMENTATION FRAMEWORK

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Binary instrumentation as referred to herein is the process of inserting additional code into a set of executable code. The additional code is designed to generate profile information that provides an insight in the execution of the set of executable code. For example, profile information generated by such additional code may indicate the most frequently executed portions of the set of executable code. Profile information about the set of executable code may be used to guide any subsequent optimization of the most frequently executed portions of the code and to improve the overall run-time performance.

Binary instrumentation is typically performed on binary files. A binary (or executable) file as referred to herein is a file that stores the set of executable instructions for a computer program. Binary instrumentation usually involves identifying the executable code section (or code segment) of the computer program, disassembling some or all of the code section, and inserting instrumentation code at one or more points (or locations) in the code section of the program. For example, during binary instrumentation, instrumentation code may be inserted at a particular point in the executable code of a computer program that is stored in the binary file being instrumented. During the execution of the computer program, each time the instrumentation code is executed, the instructions in the instrumentation code cause a counter to be incremented. Thus, when the execution of the computer program is complete, the counter would indicate the number of times that the portion of the computer program incorporating the particular point was executed.

The presently available binary instrumentation techniques use heuristics and/or assumptions about the source code and the structure of a computer program in order to determine the points in the program at which to insert instrumentation code. Using heuristics and assumptions to determine where in a computer program to insert the instrumentation code has several disadvantages.

One such disadvantage is that since the heuristics and the assumptions about a computer program may not always be correct, the presently available binary instrumentation techniques are not reliable and robust in all cases and cannot guarantee the correctness of any profile information generated by executing an instrumented binary file. For this reason, the presently available commercial binary instrumentation tools typically warn its users that binary files instrumented with the tools may exhibit unexpected behavior when executed. Furthermore, since the profile information generated by executing such instrumented binary files is not accurate, such profile information cannot be reliably used to analyze and further optimize the computer program.

Another disadvantage of using heuristics and assumptions to determine where in a computer program to insert the instrumentation code are the high run-times of instrumented binary files. Since the heuristics and assumptions are not always correct, instrumentation code is typically inserted in more places in the computer program than necessary. This results in the execution of a larger number of unnecessary instructions when the instrumented binary file is executed. Furthermore, any instrumentation code inserted in a binary file must include additional instructions to save and restore registers used by the instrumentation code in order to preserve the proper context and flow of execution of the computer program.

SUMMARY

To enable the reliable instrumentation of a binary file, one embodiment of the present invention provides a mechanism for instrumenting a binary file based on annotation information that is included in the binary file. By including in the binary file annotation information that accurately describes the structure of the computer program represented in the binary file, it is possible to collect accurate profile information about the computer program when the instrumented binary file is executed in a train run.

In one embodiment, a binary file is accessed. The binary file comprises a code section that represents the executable code of a computer program. The binary file also comprises annotation information that indicates the boundaries of one or more portions of the computer program. The portions of the computer program indicated by the annotation information may be functions included in the computer program or basic blocks within the functions. The binary file is instrumented by inserting a set of instrumentation code at one or more points in the code section of the computer program, where the one or more points are determined based at least on the annotation information. In this embodiment, a particular point at which the set of instrumentation code is inserted may be identified as the boundary of a particular portion of the computer program. For example, the set of instrumentation code may be inserted at the beginning of a function or a basic block. In this embodiment, accurate data flow information and control flow information may be generated based on the annotation information included in the binary file. The accurate data flow and control flow information may be used to determine the particular points in the computer program where the set of instrumentation code is to be inserted.

In this embodiment, a profile section for storing profile information for the computer program is inserted in the binary file when the binary file is instrumented. The set of instrumentation code comprises a group of instructions which, when executed, modifies the profile information. For example, the profile information may comprise one or more profile counters that are associated with the one or more portion of the computer program that are being instrumented. In this example, a group of instrumentation instructions inserted at a particular portion of the computer program, when executed, increments the profile counter associated with that particular portion.

In one embodiment, a mechanism is provided for inserting the set of instrumentation code in the binary file in a manner that ensures efficient execution of the instrumented binary file. Based on the annotation information included in the binary file, a determination is made whether there are one or more free register at a particular point in the computer program where a set of instrumentation code is to be inserted. If such one or more free registers are found, then these free registers are used by the instructions included in the set of inserted instrumentation code. In this way, the set of instrumentation code does not need to include additional instructions to save and then restore any registers used by the instructions in the instrumentation code.

In this embodiment, the annotation information included in the binary file may further include information that identifies a specific instruction. The specific instruction may be an instruction which, when executed, is guaranteed to free one or more registers. If such specific instructions is located within a basic block that is selected for instrumentation, then the instrumentation code for that basic block is inserted within the basic block after the specific instruction, and the instructions in the instrumentation code are set to use registers that are freed by the specific instruction.

To optimize the instrumentation of a binary file, one embodiment of the present invention provides a mechanism to prepare a binary file for future instrumentation. First object code and second object code are linked into a binary file. The first object code is created by compiling the source code of a computer program. The second object code comprises a first set of instrumentation code that is not referenced by any instructions in the object code of the computer program. The second object code stores commonly used instrumentation routines that are referenced by a second set of instrumentation code, which second set is inserted in the binary file when the binary file is subsequently instrumented. In this embodiment, the first object code may further comprise annotation information that describes the structure of the computer program. By linking commonly used instrumentation routines into the binary file before the binary file is instrumented, an optimal layout of executable code within the binary file is achieved when the binary file is subsequently instrumented. This in turn provides for a more efficient execution when the instrumented binary file is executed.

DETAILED DESCRIPTION OF EMBODIMENT(S)

I. General Overview

Techniques for binary instrumentation that uses annotation information are provided for reliably instrumenting binary files. The binary instrumentation is performed on binary files based on annotation information stored in the binary files. The annotation information indicates the boundaries of one or more portions of the computer program represented in a binary file, such as, for example, functions implemented in the computer program and basic blocks within such functions. In some embodiments, the annotation information may also include additional information, such as, for example, indications about switch tables, multiple entry functions, and specific instructions within the computer program. The binary instrumentation techniques described herein are robust and reliable because the annotation information stored in the binary file accurately identifies the code and data sections of the computer program, as well as any other portions or instructions of the computer program for which profile information may need to be collected. The accurate annotation information stored in the binary file allows the software application performing the binary instrumentation to accurately determine and select the points in the computer program at which to insert instrumentation code and to safely insert the necessary instrumentation code at these points. In addition, based on the accurate annotation information stored in the binary file, the points in the computer program at which instrumentation code is inserted may be selected in such a way as to ensure an efficient execution of the instrumented binary file.

Figure 1A:
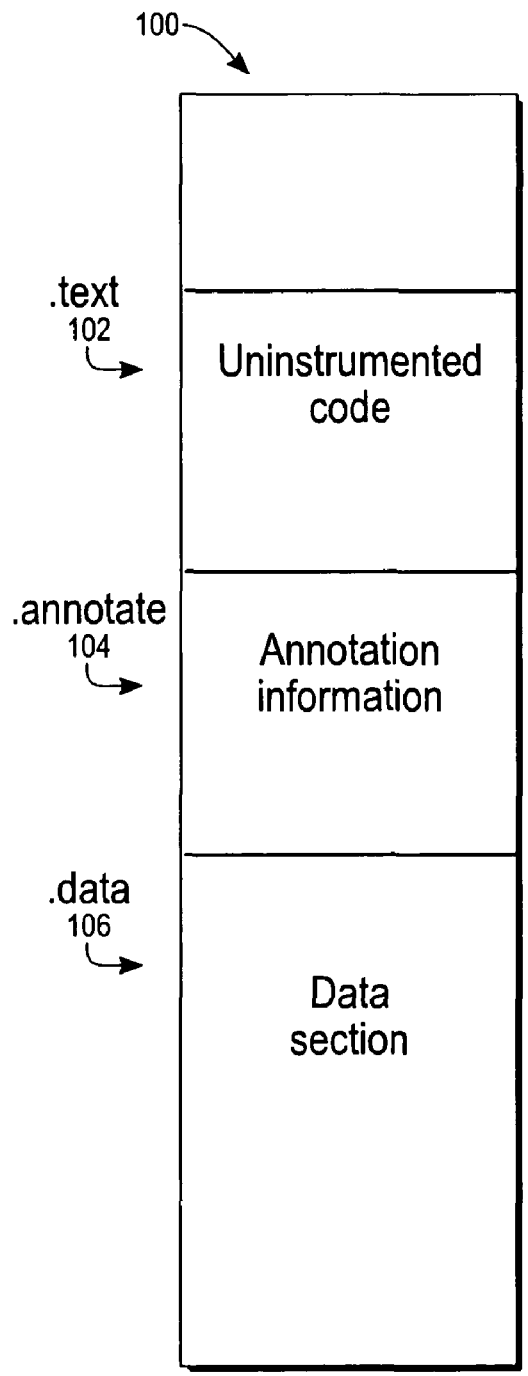
FIG. 1A is a block diagram illustrating an uninstrumented binary file according to an embodiment.

FIG. 1A is a block diagram illustrating an uninstrumented binary file according to one embodiment. In FIG. 1A, binary file 100 comprises at least a code section (or code segment) 102, data section (or data segment) 106, and annotation information section 104.

Binary file 100 is generated by compiling and/or linking the source code of a computer program. Code section ".text" 102 stores the uninstrumented executable code of the computer program. Data section ".data" 106 includes the space for storing data variables or any other data that is referenced by the instructions in code section 102.

Annotation information section ".annotate" 104 stores the annotation information about the computer program that is provided by the compiler that compiled and/or linked the source code of the program into binary file 100. The annotation information stored in section 104 indicates the boundaries of one or more portions of the computer program, such as, for example, functions and basic blocks. The annotation information stored in section 104 may also include information indicating the boundaries of sections 102, 104, and 106 that are depicted in FIG. 1A. During the process of instrumenting binary file 100, the annotation information stored in section 104 is used to determine the point or points in the computer program at which instrumentation code is inserted. The contents of the annotation information will be elaborated upon in a separate section hereinafter.

Techniques for preparing a binary file for future binary instrumentation are also provided. During the process of compiling and/or linking a computer program into a binary file, the object code of the computer program is linked together with additional object code. The additional object code includes a set of utility routines that are not referenced by any instructions in the executable code of the computer program. Instead, some of the utility routines in the additional object code may be referenced by instrumentation code that is subsequently inserted in the binary file during binary instrumentation. When the binary file is instrumented by inserting instrumentation code at one or more points in the executable code of the computer program, a flag is set to indicate that during execution the binary file will be run for collection of profile information. When the binary file is executed, a utility routine may be called to check the flag and determine whether the binary file is instrumented and is run to collect profile information. When the instrumented binary file is run in the profile collection mode, the instrumentation code collects profile information and may call a utility routine during the final stage of execution in order to export the collected profile information into a profile file.

In some embodiments, the process of preparing a binary file for future binary instrumentation may be performed by a compiler and/or linker that compiles and/or links a computer program into a binary file. Further, the process of preparing a binary file for future binary instrumentation may also comprise one or more of the following: storing annotation information about the computer program in an annotation section, including a special profile counters section in the binary file for storing collected profile information, and including one or more data variables in the data section of the computer program for storing values to be used during the execution of the instrumented binary file.

Figure 1B:
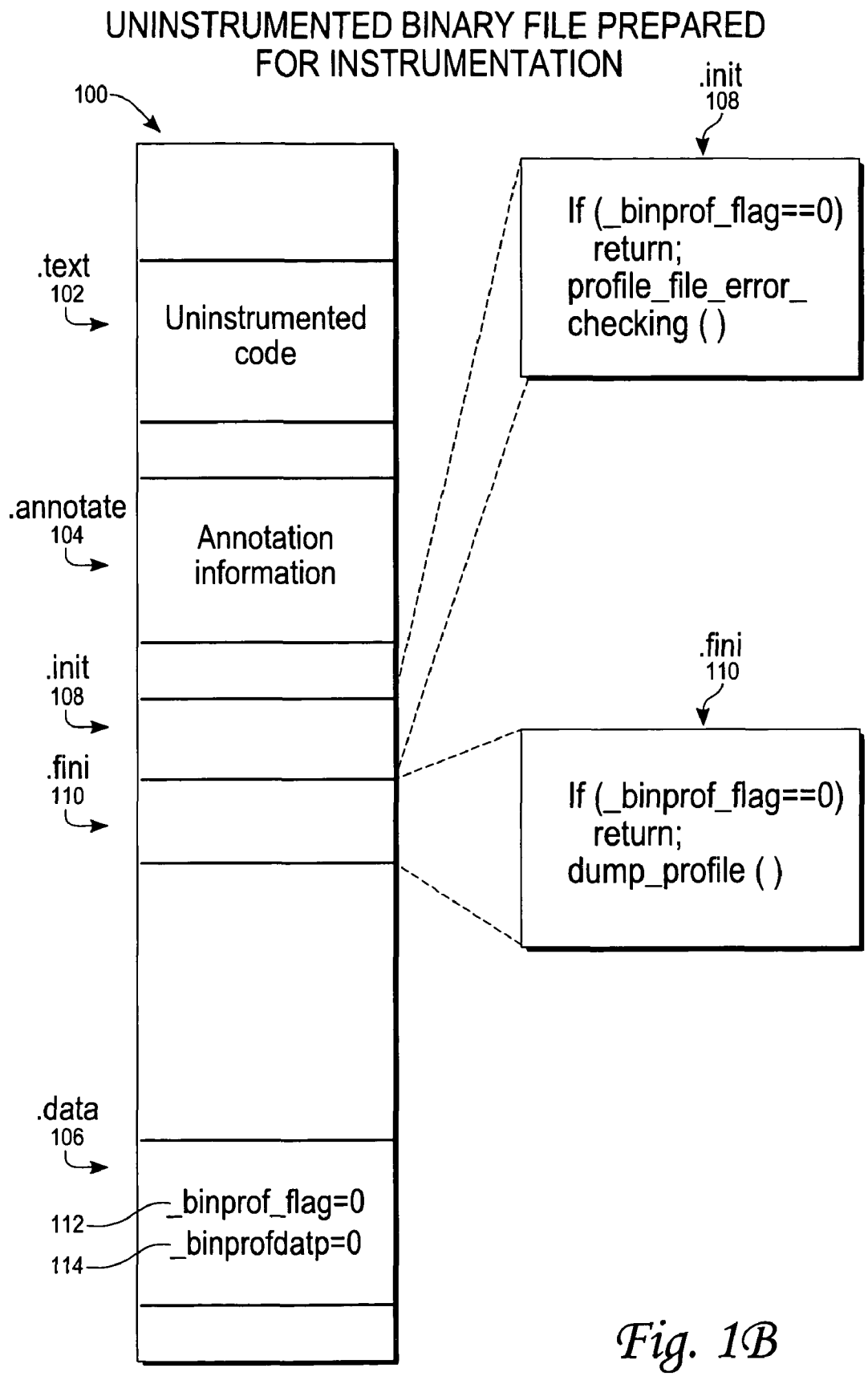
FIG. 1B is a block diagram illustrating an uninstrumented binary file that is prepared for instrumentation according to an embodiment.

FIG. 1B is a block diagram illustrating an uninstrumented binary file that is prepared for instrumentation according to one embodiment. Binary file 100 comprises code section 102, data section 106, annotation information section 104, and utility code sections 108 and 110.

In FIG. 1B, binary file 100 is generated by compiling and linking the source code of a computer program. Also linked in binary file 100 are one or more additional object files that include code for utility routines that are referenced by instrumentation code which is subsequently inserted during binary instrumentation. Code section ".text" 102 stores the uninstrumented executable code of the computer program.

Data section ".data" 106 includes the space for storing data variables or any other data that is referenced by the instructions in code section 102. In addition, data section 106 includes data variables 112 and 114 which may be referenced by subsequently inserted instrumentation code or by any code in utility code sections 108 and 110. Data variable 112 ("_binprof_flag") is a flag, the value of which indicates whether binary file 100 has been instrumented. As depicted in FIG. 1B, the value of data variable 112 is set to "0" to indicate that binary file 100 has not yet been instrumented. Data variable 114 ("_binprofdatp") is a pointer that stores the virtual address of a profile counters section in which profile information is to be collected. As depicted in FIG. 1B, the value of data variable 114 is set to "0" to indicate that a profile counters section has not yet been included in binary file 100. In some embodiments, the profile counters section is included in binary file 100 during subsequent binary instrumentation. In these embodiments, the value of data variable 114 is set to the address of the profile counters section when that section is included in the binary file. In other embodiments, the profile counters section may be included in binary file 100 during linking as part of the process of preparing binary file 100 for future instrumentation. In these embodiments, the value of data variable 114 is set by the linker to the virtual address of the profile counters section that is being inserted in binary file 100.

Sections 108 (".init") and 110 (".fini") depicted in FIG. 1B include the code for one or more common utility routines. The one or more routines may be referenced by instrumentation code which is subsequently inserted in binary file 100 during binary instrumentation. In one embodiment, the code in sections 108 and 110 is stored in object files that are commonly used by a compiler in any binary files generated by the compiler. By storing the utility routines referenced by instrumentation code in commonly used object files and then linking the object files into binary files prepared for instrumentation, the techniques described herein provide for uniformity in binary instrumentation since any instrumentation code subsequently inserted into the prepared binary files needs to only include the appropriate instruction for invoking already known and linked routines.

II. Reliable Binary Instrumentation Using Annotation Information

Techniques for reliable binary instrumentation based on annotation information are described in detail hereinafter.

In one embodiment, a binary file that comprises at least a code section and annotation information is accessed by a binary instrumentation application. The code section of the binary file represents the executable code of a computer program. The annotation information indicates the boundaries of one or more portions of the computer program and may be stored in a separate section of the computer program. The portions of the computer program indicated by the annotation information include, but are not limited to, the code section and data sections of the computer program, functions and basic blocks in the computer program, and specific instructions in the executable code of the computer program. The binary file is instrumented by inserting a set of instrumentation code at one or more points in the code section of the computer program, which points are determined based at least in part on the annotation information stored in the binary file.

For example, a particular point in the code section may be identified, based on the annotation information, as one of the boundaries of a particular portion of the computer program. A set of instrumentation code may be inserted at the particular point, where the set of instrumentation code comprises a group of instructions. The group of instructions, when executed during the execution of the instrumented binary file, cause profile information stored in a profile section of the computer program to be modified.

In some embodiments, the annotation information stored in the binary file may be used to generate accurate data flow and control flow information about the computer program. In these embodiments, the points in the computer program at which instrumentation code is inserted may be determined based at least in part on any of the control flow information or the data flow information.

Annotation Information

The annotation information used by the techniques for reliable binary instrumentation described herein generally comprises information that expresses the structure of a computer program. The annotation information provides the instrumentation techniques with the capability to accurately determine the binary structure of the computer program by providing various information, such as, for example, the boundaries of the portions of the program, the existence of program data in the middle of executable code, and the existence of multiple entry points to a subroutine.

In one embodiment, the annotation information comprises at least information that indicates the boundaries of one or more portions of the computer program. The portions of a computer program indicated by annotation information include, but are not limited to, the code and data sections of the computer program, and functions and basic blocks in the computer program. In addition, the annotation information may further include information about specific instructions within functions or basic blocks of the computer program. A function as referred to herein is a set of code to which flow of execution can be passed from a calling entity (such as, for example, another function), and which can return the flow of execution to the calling entity. A basic block is a set of code within a function in which execution flow always enters at the beginning of the block and finishes at the end of the block.

In one embodiment, the annotation information is inserted in the code of a computer program by a compiler, which compiles and links the code of the computer program into a binary file. The annotation information for a computer program that is stored in a binary file may include one or more of the following:

- the address and size of all annotated code in a module of the computer program;
- the starting address and size of each function and each basic block within each function of the computer program;
- information about multiple entry points to a function (for example, information about instructions such as the Fortran ENTRY statement);
- detailed control flow information for indirect branch instructions (for example, the C/C++ switch and Fortran GOTO statements);
- information about any position-independent executable code addresses;
- information about the location of a specific instruction in the executable code;
- information about data embedded in the executable code section of the computer program;
- information about indirect calls, tail calls, and calls that return a structure instruction; and
- information about any references to execution code addresses in the binary file.

In one embodiment, the annotation information is created and placed, at compile time, in an Executable and Linker Format (ELF) section in each object file that stores object code of the computer program. The ELF sections from each object file are concatenated into one ELF section when the binary file representing the computer program is created. (The ".annotate" section 104 in FIGS. 1A and 1B is an example of such section.) The annotation record for each object file starts with a header identifier, which consists of a signature, version number, and the size of the information contained in the annotation record. The header identifier is followed by one or more annotation identifiers that express the structure of the module of the computer program stored in the object file. Each annotation identifier comprises a unique ID which indicates the particular type of annotation information and a size field for storing the size of the annotation information. The annotation identifier is followed by specific annotation information that is associated with the particular annotation type.

In some embodiments, the annotation information stored in a binary file may be used to build accurate data flow and control flow information about the computer program represented in the binary file. Data flow information as referred to herein is information that tracks the values of data variables and registers at different points in the execution of a computer program. Control flow information as referred to herein is information that defines the basic structural elements of the computer program and the relationships among them. The data flow and control flow information generated based on annotation information may represent the data flow and control flow graphs of the computer program, respectively, and may be used to accurately determine the points in the computer program where instrumentation code is to be inserted. Methods and techniques for creating data flow and control flow information and data flow and control flow graphs are described in detail in Alfred V. Aho, et al., *Compilers: Principles, Techniques, and Tools*, Addison-Wesley 1996, ISBN 0201100886, the entire contents of which are incorporated by reference herein.

Instrumenting a Binary File

Figure 2A:
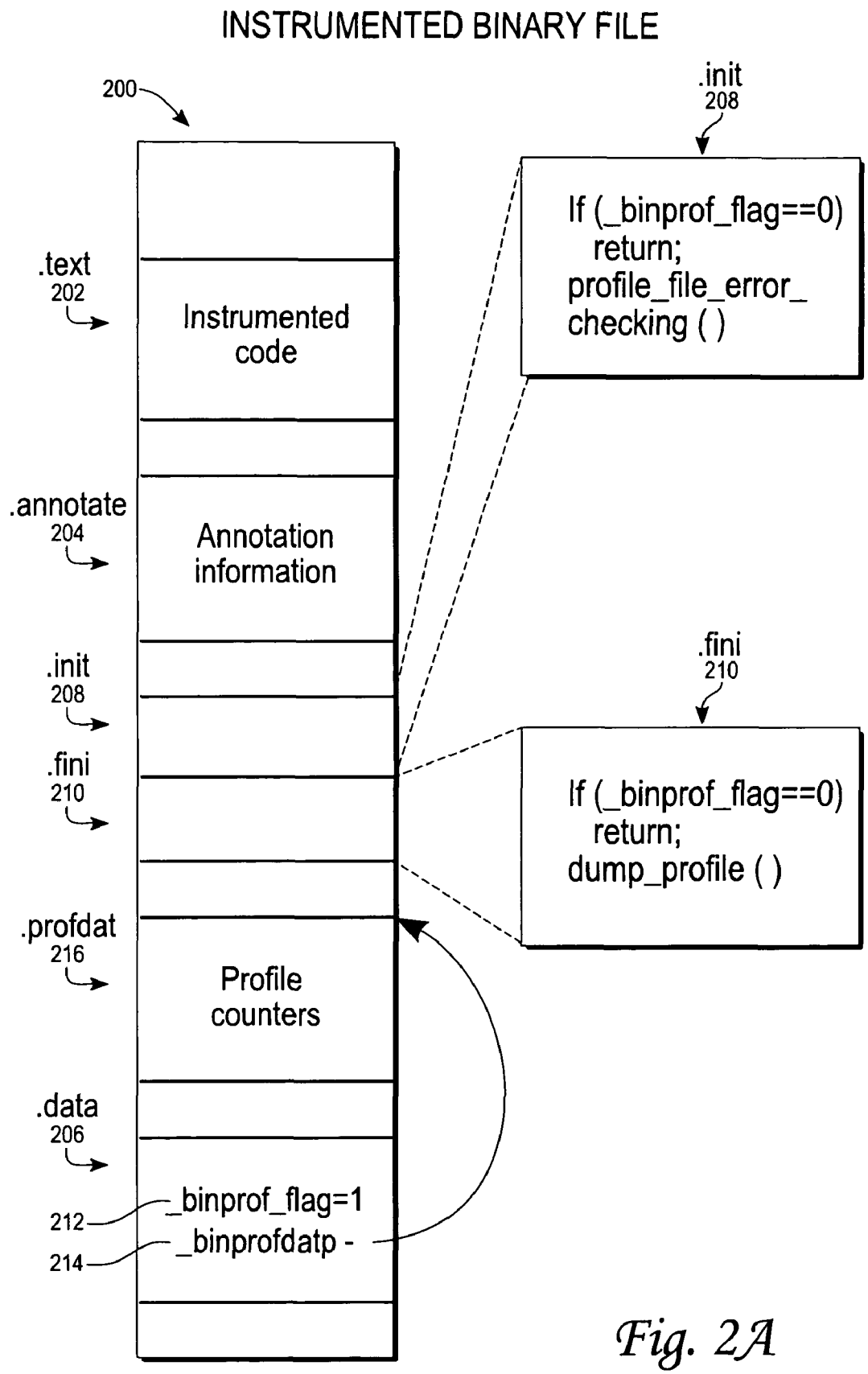
FIG. 2A is a block diagram illustrating a binary file instrumented according to an embodiment.

In one embodiment, binary files that store annotation information are instrumented according to the techniques described herein. FIG. 2A is a block diagram illustrating a binary file representing a computer program that is instrumented according to this embodiment. In FIG. 2A, binary file 200 comprises code section 202, utility routines sections 208 and 210, profile counters section 216, and data section 206. Code section 202 (section ".text") stores the instrumented executable code of the computer program. Utility routines sections 208 and 210 (sections ".init" and ".fini", respectively) store routines and code that are called during the execution of instrumented binary file 200. Profile section 216 (section ".profdat") stores profile information that is modified by the instrumentation code stored in section 202 when this instrumentation code is executed as part of executing instrumented binary file 200. Data section 206 (section ".data") stores the space for the data that is accessed by the executable instructions in section 202. Binary file 200 may also optionally include annotation information section 204 (section ."annotate") that stores the annotation information based on which the binary file is instrumented.

In this embodiment, the source code and/or object code of the computer program is compiled with a special compiler flag that directs the compiler to include accurate annotation information about the program in the uninstrumented binary file. The special compiler flag may also direct the compiler to link into the binary file a special commonly used object file that stores one or more symbols that represent one or more data variables, the values of which may be used during the execution of the instrumented binary file. Examples of such variables are variables "_binprof_flag" 212 and "_binprofdatap" 214 depicted in FIG. 2A. The commonly used object file may also include one or more utility routines that may also be called during the execution of the instrumented binary file. Examples of such routines are the routines and code included in utility routines sections 208 and 210 depicted in FIG. 2A.

Referring to FIG. 2A, binary file 200 is instrumented according to the techniques for reliable binary instrumentation based on annotation information as described herein. The value of data flag "_binprof_flag" 212 in data section 206 is set to "1" in order to indicate that binary file 200 has been instrumented. When binary file 200 is executed to collect profile information, the value of data flag 212 is checked by the code included in section 208. If the value of data flag 212 is equal to "1", then additional utility instrumentation code (such as function "profile_file_error_checking( )") may be performed before profile information collection begins.

Figure 2B:
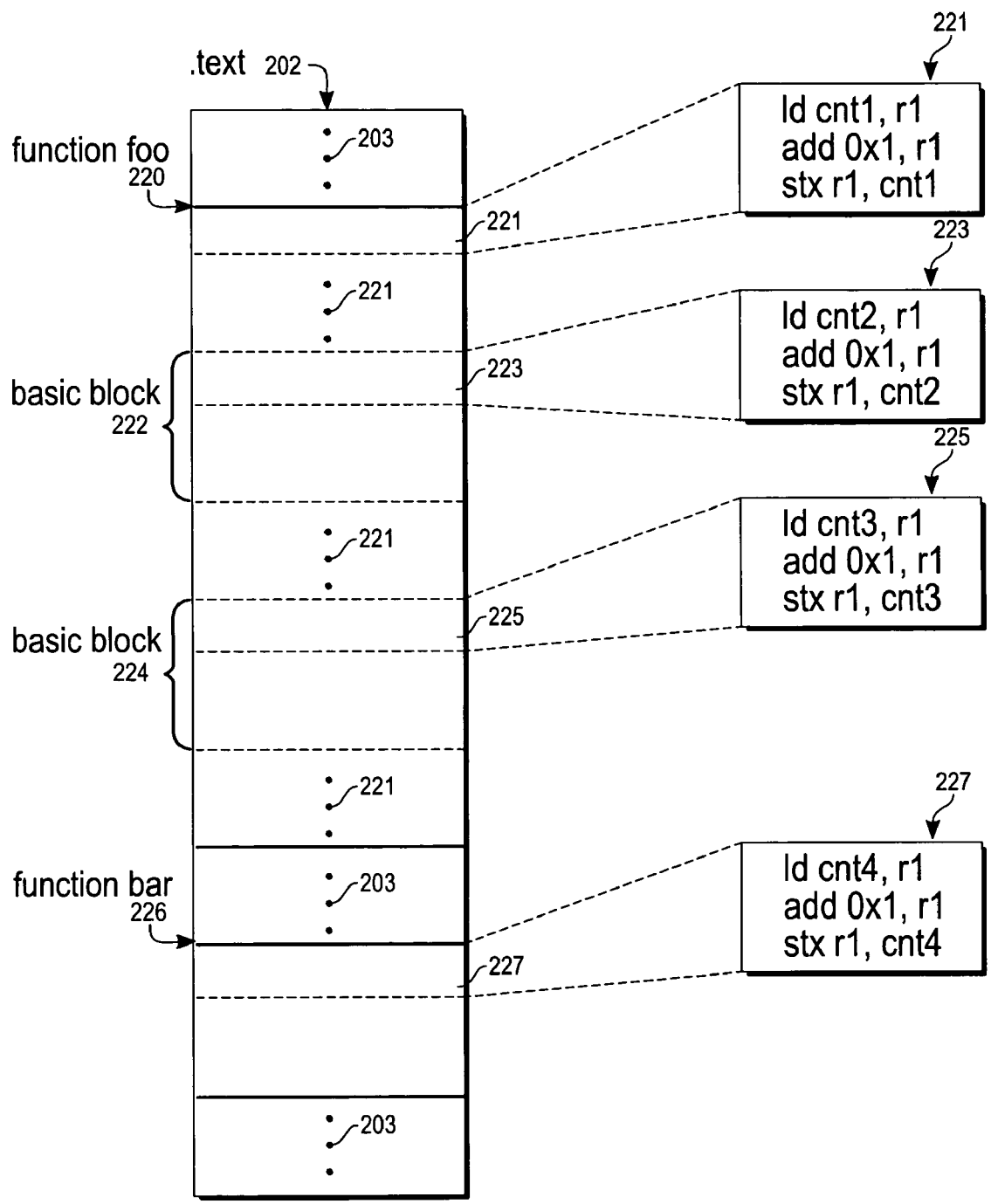
FIG. 2B is a block diagram illustrating the placement of instrumentation code within a binary file instrumented according to an embodiment.
Figure 2C:
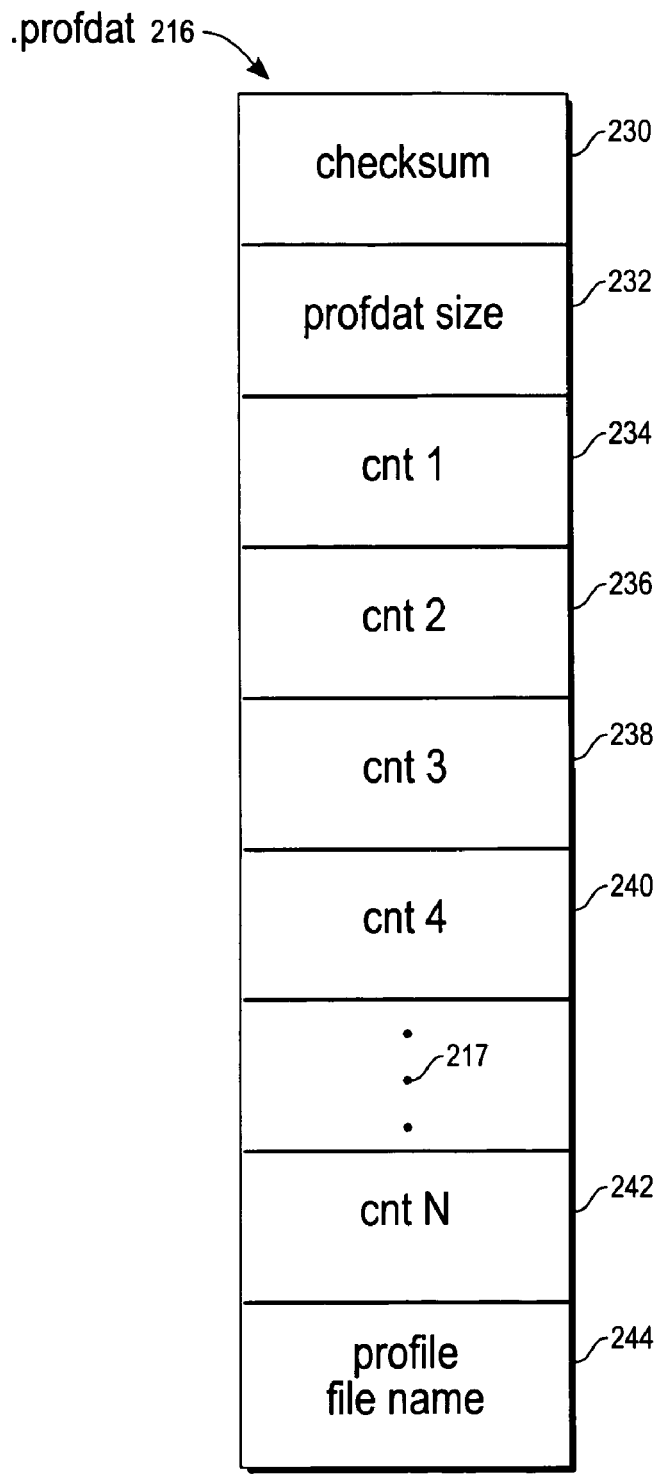
FIG. 2C is a block diagram illustrating the format of a profile counters section in a binary file instrumented according to an embodiment.

Profile section 216 is then included in binary file 200 to provide space for storing the profile information that is to be collected when the binary file is executed. Profile section 216 includes a counter for each portion of the computer program (such as functions and/or basic blocks) that is identified for profile collection based on the annotation information and/or the control flow information. FIG. 2C is a block diagram illustrating the format of a profile counters section in a binary file instrumented according to this embodiment.

In FIG. 2C, profile section ".profdat" 216 comprises checksum field 230, size field 232, one or more counter fields (such as fields 234, 236, 238, 240, and 242), and profile filename field 244. (Ellipsis 217 in FIG. 2C indicates that profile section 216 may store an arbitrary number of counter fields.)

Checksum field 230 stores a value that is computed based on the control flow information and on the instructions included in the instrumented binary file. The value of checksum field 230 is used to prevent any misuse of collected profile information after that information is extracted following the execution of the instrumented binary file. Size field 232 stores the size of profile section 216. Each of counter fields 234-242 stores a value which indicates the number of times the portion of the computer program associated with that counter field is executed during the execution of the instrumented binary file. Profile filename field 244 stores the name of the profile file to which the values of the profile counters are exported after the execution of the instrumented binary file.

After the profile section is inserted in the binary file being instrumented, any values of data variables pointing to that section are set to reflect the address of that section. For example, as illustrated in FIG. 2A, the value of pointer "_binprofdatp" 214 is set to the virtual address of the start of profile section 216. The value of pointer 214 is used to access the profile section 216 when the profile information stored in this section is to be exported to a profile file. For example, the value of pointer 214 may be used by the "dump_profile( )" function in section 210 of binary file 200, when this function is called to export the profile information collected during the execution of the binary file.

After the profile section that stores the profile counter is inserted in the binary file being instrumented, instrumentation code is added at one or more points in the computer program. Each of the one or more points at which instrumentation code is added is associated with one or more portions of the computer program, such as, for example, one or more functions or basic blocks. In some embodiments, the functions and basic blocks to which instrumentation code is added may be selected based on the annotation information stored in the binary file and on the control flow graph generated for the entire computer program. Since in these embodiments the annotation information and the control flow graph are accurate with respect to the structure of the computer program, instrumentation code may be added to a minimal number of functions and basic blocks, and the frequencies of execution of other functions and basic blocks may be deterministically derived from the profile counters associated with the functions and basic blocks that are instrumented.

Sample Instrumentation Code in Instrumented Binary Files

The instrumentation code inserted in the portions of the computer program represented in an instrumented binary file typically comprises of a group of instructions, which instructions, when executed, load the profile counter associated with that portion of the computer program, increment the counter, and store the incremented counter back in memory. When the instrumentation code is inserted in a portion of the computer program, such as a function or basic block, care must be taken to ensure that none of the registers used by the function or basic block are overridden by the instrumentation code. Otherwise, overriding such "live" registers may lead to incorrect program behavior.

In some embodiments, the techniques for reliable binary instrumentation described herein provide for mechanisms to determine whether there are any free registers in a function or basic block in which instrumentation code is to be inserted. Examples of such mechanisms are described in a separate section hereinafter.

In other embodiments, the techniques for reliable binary instrumentation described herein may use additional instructions to first store registers used by the instrumentation code on the stack, and then restore the values of the used registers from the stack when the instrumentation code completes execution. Example of such instrumentation code (including the additional instructions) is provided in Table 1 below.

TABLE 1

Sample Instrumentation Code

| Line | Instruction | |
|---|---|---|
| 1 | add | %sp, −0x200, %sp |
| 2 | stx | %o0, [%sp + 0x120] |
| 3 | stx | %o1, [%sp + 0x130] |
| 4 | stx | %o2, [%sp + 0x140] |
| 5 | sethi | %hi(0x40000), %o0 |
| 6 | or | %o0, 0, %o0 |
| 7 | ldx | [%o0 + 0x30], %o2 |
| 8 | add | %o2, 0x1, %o2 |
| 9 | stx | %o2, [%o0 0x30] |
| 10 | ldx | [%sp + 0x120], %o0 |
| 11 | ldx | [%sp + 0x130], %o1 |
| 12 | ldx | [%sp + 0x140], %o2 |
| 13 | add | %sp, 0x200, %sp |

The group of instrumentation instructions listed in Table 1 use three registers to increment a profile counter: registers "%o0", "%o1", and "%o2". Specifically, the instruction in Line 1 reserves some space on the stack. The instructions in Lines 2-4 store the current values of registers "%o0", "%o1", and "%o2" in the space allocated on the stack. The instruction in Line 5 loads the address of the profile counters section into register "%o0" (e.g. the value 0x40000 of pointer "_binprofdatp" 214 depicted in FIG. 2A). The instruction in Line 7 loads the value of the particular profile counter (in this example, the counter located at address 0x40030) in register "%o2". The instruction in Line 8 increments the value of register "%o2", and the instruction in Line 9 stores the value in register "%o2" back in the memory allocated to the profile counter. The instructions in Lines 10-12 restore the previous values of registers "%o0", "%o1", and "%o2" from the stack, and the instruction in Line 13 releases the reserved stack space. In this way, the group of instrumentation instructions listed in Table 1 increments the profile counter and preserves the flow of execution of the computer program.

In one embodiment, the instrumentation code is inserted at the beginning of the portions of the computer programs that are selected for instrumentation according to the techniques described herein. FIG. 2B is a block diagram illustrating the placement of instrumentation code according to this embodiment. In the embodiment depicted in FIG. 2B, the instrumentation code depicted in boxes 221, 223, 225, and 227 is for illustration purposes only and is not expressed in any particular programming language. Furthermore, in FIG. 2B it is presumed that the registers used in the instrumentation code depicted in boxes 221, 223, 225, and 227, namely, registers "r1", "r2", "r3", and "r4" are free registers at the points in the functions and basic blocks where the instrumentation code is inserted.

FIG. 2B depicts a portion of code section 202 that is included in binary file 200 depicted in FIG. 2A. With reference to FIG. 2B, code section 202 includes the executable code for function 220 (function "foo") and function 226 (function "bar"). Ellipses 203 indicate additional code that is not shown in the figure. Function 220 includes basic blocks 222 and 224. (Ellipsis 221 indicates that function 220 may include additional code that is not shown in the figure.) Function 226 does not include basic blocks that are instrumented.

As depicted in FIG. 2B, instrumentation code 221 is inserted at the beginning of function 220. Function 220 is associated with profile counter "cnt1", and instrumentation code 221, when executed, increments this counter each time function 220 is executed. Instrumentation code 223 is inserted at the beginning of basic block 222. Basic block 222 is associated with profile counter "cnt2", and instrumentation code 223, when executed, increments this counter each time basic block 222 is executed. Similarly, instrumentation code 225 is inserted at the beginning of basic block 224. Basic block 224 is associated with profile counter "cnt3", and instrumentation code 225, when executed, increments this counter each time basic block 224 is executed. Instrumentation code 227 is inserted at the beginning of function 226. Function 226 is associated with profile counter "cnt4", and instrumentation code 227, when executed, increments this counter each time function 226 is executed. In this way, profile information representing the number of times each function or basic block is executed during the execution of binary file 200 is collected.

In other embodiments, instrumentation code may not necessarily be inserted at the beginning of a portion of the computer program, such as a function or a basic block. Techniques for inserting instrumentation code within a basic block or function are elaborated upon in a separate section hereinafter.

Executing Instrumented Binary Files

In one embodiment, when an instrumented binary file is executed, profile counters are collected in the profile counters section (such as ".profdat" section 216 depicted in FIG. 2A) of the memory image of the process created to execute the binary file. When the process created to execute the binary file runs, a set of code or a utility routine (such as the code in section ".init" 208 depicted in FIG. 2A) may be called to determine whether the binary file is instrumented and whether profile information will be collected. (For example, such determination may be made based on the value of "_binprof_flag" 212 depicted in FIG. 2A.) Just before the process created to execute the binary file is about to exit, an export routine (such as "dump_profile( )" function in section ".fini" 210 depicted in FIG. 2A) may be called to export the contents of the profile counters section into a profile file.

Before the export routine is executed, a check may be performed to ensure that the binary file is instrumented and is being run to collect profile information. (This check may also be performed based on the value of the "_binprof_flag" 212 depicted in FIG. 2A.) The export routine accesses the profile counters section, and creates a profile file with the filename as indicated by information stored in the section. (For example, the value stored in filename field 244 depicted in FIG. 2C may be used as a name for the profile file.) After creating the profile file, the export routine stores the value of each profile counter under a corresponding entry in the profile file. If the instrumented binary file is executed multiple times or is executed in a multi-processor environment, the profile file may already be created and may store previous values for each profile counter. In this case, the export function may first check to make sure it is accessing the correct profile file. (This check may be performed, for example, based on the values of checksum field 230 and filename field 244 depicted in FIG. 2C.) When the export function determines that it is accessing the correct profile file, the export function adds the currently collected values of the profile counters to the corresponding previous values of the counters that are stored in the profile file.

Detecting and Preventing Profile Information Misuse

In one embodiment, a mechanism is provided to prevent a misuse of the profile information generated by executing an instrumented binary file. The profile section, which may be included in the binary file when the binary file is instrumented, stores a checksum that is derived based on information included in the binary file. (Field 230 in FIG. 2C is an example of a field in the profile section that may store the checksum value.) Specifically, the checksum value is a number computed for the particular binary file that is unique for that binary file; if the binary file is later re-compiled then it would be a different binary file with a different checksum.

The profile section may also include a version number for the binary file. When the instrumented binary file is executed, at the end of the execution of the binary file a routine is called to export the profile information to a profile file. Among other things, the profile information that is exported includes the checksum of the binary file as well as any version number that may be stored in the profile section.

The profile information stored in the profile may be used later for further analysis and optimization of the binary file. Before the profile information stored in the profile file is later accessed for the purpose of further optimization and analysis of the binary file, the checksum and/or the version number stored in the profile file are checked to ensure that the profile file matches the binary file which being analyzed. For example, a checksum is first computed for the binary file that is to be analyzed; the computed checksum is then matched against the checksum stored in the profile file. If the computed and stored checksums match, then the correct profile information is going to be used to in the subsequent analysis of the binary file.

Binary Profile Instrumentation Applications

The techniques for reliable binary instrumentation described herein may be performed by separate software applications, or by a single binary instrumentation framework application that includes one or more modules for performing the different tasks. In general, the techniques for reliable binary instrumentation described herein are not limited to being programmed as a particular type of software application, integrated development platform, software development kit, or any other form of software or hardware. In addition, the techniques for reliable binary instrumentation described herein are not limited to being performed on files only, but may be performed on any executable code that is processed and executed by any now known or later developed operating system on any now known or later developed computer hardware platform or device.

In one embodiment, a binary instrumentation framework application is provided for instrumenting binary files that store annotation information. In this embodiment, the annotation information may be included in the binary file by executing a particular compiler with a specific flag. For example, the command % cc -xbinopt=prepare *.c -o a.out directs a C/C++ compiler to create the binary file "a.out" from the source code of a computer program that is stored in one or more ".c" files. The flag "-xbinopt" is set to "prepare" in order to direct the compiler to include annotation information in the generated binary file in preparation for future instrumentation. Once the binary file "a.out" is generated, it can be instrumented according to the techniques described herein by executing the command % binopt a.out -binstrument -o a.out.instr where the file "a.out.instr" is the instrumented version of the binary file "a.out". The instrumented binary file "a.out.instr" may then be run one or more times in order to collect profile information about the computer program represented by the binary file.

In other embodiments, the techniques for reliable binary instrumentation described herein may be performed in an environment that provides a compiler to create object files and a linker to link the object files into a binary file. In these embodiments, the compiler may include annotation information in the object files it generates, and the linker may be used to link these object files into a binary file. In yet other embodiments, an Integrated Development Environment application or software development kit may be provided that includes separate components or modules for performing the different steps or tasks of the techniques for reliable binary instrumentation described herein.

Thus, the techniques for reliable binary instrumentation described herein are not limited to being performed as a specific type of application in a specific kind of software environment, and the examples of binary instrumentation tools and applications described herein are to be regarded in an illustrative rather than a restrictive sense.

III. Efficient Train Run of Instrumented Binary Files

The techniques for reliable binary instrumentation based on annotation information described herein may include a number of optimizations in order to improve the execution performance of instrumented binary files. The execution of an instrumented binary file to collect profile information is referred to herein as a "train run" of the binary file.

In one embodiment, a binary file representing a computer program is prepared for instrumentation by including annotation information in the file according to the techniques described herein. In this embodiment, instrumenting the binary file further comprises determining one or more free registers at the particular points in the executable code of the computer program where instrumentation instructions are to be inserted. A free register as referred to herein is a register that holds a value which is not used by the executable code of the computer program. Once free registers are found at the point where the instrumentation code is to be inserted, the free registers are used by the instrumentation instructions inserted at this point to increment the corresponding profile counters. By detecting and using the free registers at any particular point where instrumentation code is inserted, the binary instrumentation techniques described herein avoid saving and then restoring the values of registers that are otherwise used at these points by the instructions of the computer program.

For example, suppose that a determination is made during the instrumentation of a binary file to insert instrumentation instructions in a particular basic block. According to the techniques described herein, the annotation information stored in the binary file may be used along with any control flow and data flow information to determine whether there are any one or more free registers that are not used by the instructions in the particular basic block or by any instructions that follow the basic block. If such one or more free registers are found for the particular basic block, then the instrumentation instructions use these one or more free registers to increment the profile counter associated with the particular basic block. In this way, the execution of the instructions in the basic block itself is not disturbed. Further, the instrumentation instructions do not need to include additional instructions to first save the registers used to increment the profile counter and then to restore the values of these registers once incrementing the counter is completed.

Identifying Free Registers

In one embodiment, free registers at a particular point in a computer program are determined based on the accurate annotation information included in the binary file representing the program. The annotation information is used to generate control flow information and data flow information before the binary file is instrumented. Since the annotation information stored in the binary file accurately represents the boundaries of the portions of the computer program (such as, for example, functions and basic blocks), the generated control flow information accurately represents the relationships between the portions of the computer program. For example, the control flow information may be expressing a control flow graph that accurately represents which functions include which basic blocks, which functions call which other functions, and which basic blocks follow which other basic blocks. Similarly, based on the accurate annotation information stored in the binary file, the generated data flow information accurately reflects which registers are used in which functions and basic blocks as well as the values stored in these registers within the scope of the functions and the basic blocks.

To determine whether a register is free at a particular point in the computer program, data flow and/or control flow information may be used to check whether the value stored in the register is being used by an instruction after the particular point or whether after the particular point the value in the register is clobbered and the register is reloaded before being used again.

For example, suppose that instrumentation needs to be added to the beginning of a particular basic block. To find a free register at the beginning of the particular basic block, data flow information may be checked to see if a particular register is not used by the instructions in the basic block. Control flow information may then be used to determine whether the value stored in the particular register is used in the particular basic block or in any other basic blocks or functions that follow the particular basic block. Data flow information and control flow information may also be used to determine whether the particular register is reloaded before being used again at any point after the beginning of the particular basic block. If a determination is made that the particular register is not being used in any instructions that follow the beginning of the particular basic block or that the register is reloaded before it is used again, the register is designated as a free register and may be used by instrumentation instructions to increment the profile counter that is associated with the particular basic block.

Inserting Instrumentation Code within a Basic Block

In one embodiment, the annotation information stored in a binary file may include information indicating the location of a specific instruction within a basic block or function of the computer program. The specific instruction may be any instruction that is guaranteed to produce one or more free registers when executed. Thus, when the annotation information stored in the binary file includes information indicating the location of such specific instruction in a basic block, the annotation information and/or any data flow information generated from the annotation information may be used to locate the specific instruction. After the specific instruction is located within the basic block or function, instrumentation code may be inserted right after the instruction within the basic block, and the instructions in the instrumentation code may be set to use the free registers produced by the specific instruction.

Specific instructions which produce a window of free registers are supported by some, if not most, computer processor architectures. For example, the SPARC processor architecture developed by Sun Microsystems, Inc., supports the SAVE instruction. When executed, the SAVE instruction saves the values of some registers on the stack and allocates a new set of registers in place of the saved registers. The SAVE instruction then uses the new set of registers to perform what is essentially an add operation. After the SAVE operation completes, a separate RESTORE instruction is needed to restore the values of the saved registers. In this way, the registers saved by the SAVE instruction effectively become a set of free registers until the RESTORE instruction is executed. If instrumentation code is inserted immediately after such SAVE instruction within a basic block, the instrumentation code may use the registers saved by the SAVE instruction to increment the profile counter associated with the basic block without the need to include additional instructions for saving and restoring registers. Other examples of instructions that produce free registers when executed are any instructions that use volatile cross-call registers, the use of which after the instructions are executed is not recommended.

In this manner, the techniques described herein provide for inserting instrumentation code after specific instructions within a basic block. By allowing the placement of instructions within a basic block, the techniques described herein provide for more opportunities to find free registers. The ability to insert instrumentation code within a basic block (as opposed to only at the beginning or end of the basic block) is based at least in part on the accurate annotation information stored in the instrumented binary files that is used to generate accurate control flow and data flow information.

Figure 3:
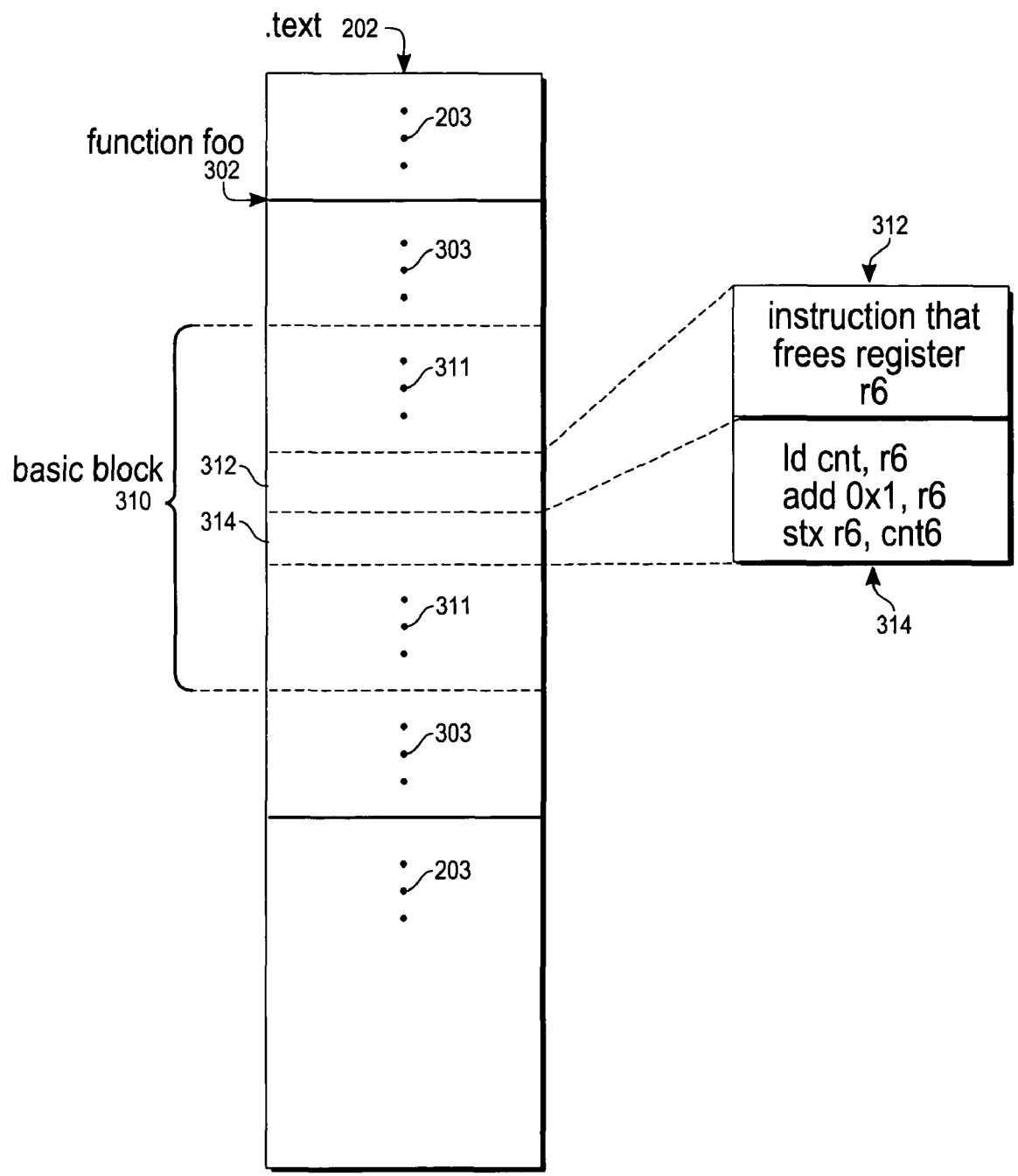
FIG. 3 is a block diagram illustrating the placement of instrumentation code after an instruction within a basic block according to an embodiment.

FIG. 3 is a block diagram illustrating the placement of instrumentation code after a specific instruction within a basic block according to one embodiment. In the embodiment depicted in FIG. 3, the instrumentation code depicted in box 314 is for illustration purposes only and is not expressed in any particular programming language.

FIG. 3 depicts a portion of code section 202 that is included in binary file 200 depicted in FIG. 2A. With reference to FIG. 3, code section 202 includes the executable code for function 302 (function "foo"). Ellipses 203 indicate additional code for code section 202 that is not shown in the figure. Function 302 includes basic block 310. (Ellipsis 303 indicates that function 302 may include additional code that is not shown in the figure, and ellipsis 311 indicates that basic block 310 may also include additional code that is not shown.)

As depicted in FIG. 3, instrumentation code 314 is inserted within basic block 310 immediately after instruction 312. Instruction 312 is an instruction that is guaranteed to produce a set of free registers when executed. (The SAVE instruction supported by the SPARC processor architecture is an example of such instruction.) Suppose that it is determined, based at least on data flow information generated for the computer program that includes code section 202, that register "r6" is guaranteed to be free after the execution of instruction 312. The instructions included in instrumentation code 314 may be set to use register "r6" to increment profile counter "cnt6" that is associated with basic block 310 without any danger that the execution flow of the basic block or the program will be compromised.

Binary Instrumentation by Using Free Registers

In one embodiment, a binary file may be instrumented by identifying free registers and using any identified free registers in instrumentation instructions for incrementing profile counters that are associated with portions of the executable code of computer program represented in the binary file.

In this embodiment, a binary file that stores accurate annotation information is first generated. Based on the annotation information, accurate data flow information and control flow information for the computer program represented in the binary file is generated. The data flow and control flow information is then used to identify functions and/or basic blocks that are going to be instrumented. A basic block that is to be instrumented is checked to determine whether there are any free registers that can be used by the instrumentation code. If it is determined, based on the control flow and data flow information, that there are free registers at the beginning of the basic block, the instrumentation code that increments a profile counter associated with the basic block is inserted at the beginning of the basic block. The instrumentation instructions in the instrumentation code are set to use the free registers to increment the profile counter. If no free registers are found at the beginning of the basic block, data flow and control information may be used to determine whether the basic block includes a specific instruction which, when executed, produces one or more free registers. If such specific instruction is found, then the instrumentation code is inserted in the basic block immediately after the specific instruction, and the instrumentation instructions in the instrumentation code are set to use the free registers generated by the specific instruction to increment the profile counter. If no such specific instruction is found within the basic block, then the instrumentation code is inserted in the beginning of the basic block and additional instructions are included in the instrumentation code for saving and restoring the registers that are going to be used to increment the profile counter. Functions or other portion of the computer program that are selected for instrumentation may be instrumented by using free registers in substantially the same manner.

IV. Extensions to Computer Program Analysis

The reliable and accurate annotation information that is included in a binary file prepared for instrumentation may further be used to provide for better and more extensive analysis of the computer program represented in the binary file than was previously possible. Further, by including in the binary file the various types of annotation information described herein, the types and aspects of computer program analysis that may be performed are broadened.

In one embodiment, extensive analysis of various aspects of a computer program may be performed on profile information that is collected during a train nm of an instrumented binary file. The profile information that is to be collected during the train run may be determined based on one or more of the following: accurate annotation information stored in the binary file; control flow and data flow information generated from the annotation information; accurate information identifying function and basic block boundaries; annotation information about the exact locations of data residing in the code section of the computer program; and annotation information identifying specific instructions in the code section of the computer program. In addition, depending on the specific aspect of the computer program that needs to be analyzed, additional specific annotation information may further be included in the binary file when the binary file is prepared for instrumentation.

The profile information collected during a train run of an instrumented binary file may include, but is not limited to, accurate information about dynamic instruction counts of load and store instructions, accurate information about dynamic trace generation, run-time indirect call statistics, accurate information about run-time register window splitting, and accurate information about specific instructions (such as, for example, memory access per instruction or number of times an instruction is executed). Thus, the profile information collected during a train run of an instrumented binary file is not limited to profile counters, and the examples of profile information provided herein are to be regarded in an illustrative rather than a restrictive sense.

V. Preparing a Binary File for Future Instrumentation

Techniques are provided herein for preparing a binary file for future instrumentation. In one aspect, the object code of a computer program is linked with special object code to generate a binary file that is prepared for instrumentation. The special object code comprises a set of instrumentation code that is not referenced by any instructions in the object code of the computer program. The set of instrumentation code in the special object code is referenced by instrumentation code that is inserted in the binary file when the binary file is instrumented.

In one embodiment, a common object file that stores commonly used instrumentation routines is linked with the object files of a computer program when the binary file that represents the computer program is generated. In this way, the binary file is better prepared for future instrumentation because the commonly used instrumentation routines are already linked and assigned fixed virtual addresses by the time the binary file is subsequently instrumented. Any instrumentation code that is subsequently inserted in the executable code of the computer program need only include instructions that call the commonly used instrumentation routines without including additional instructions to perform the functionality of these routines.

In this embodiment, the common object file that stores commonly used instrumentation routines may also include a flag, the value of which indicates whether the binary file has been instrumented. When the binary file is executed the value of the flag may be checked to determine whether to execute any of the commonly used pre-linked instrumentation routines. If the binary file has not been instrumented yet, these routines are not executed; if the binary file has been instrumented, the value of the flag would indicate so, and some or all of the commonly used instrumentation routines may be executed. Referring to FIG. 1B, the "profile_file_error_checking( )" and "dump_profile( )" routines in sections ".init" 108 and ".fini" 110, respectively, are examples of commonly used instrumentation routines that are "pre-linked" in a binary file as part of preparing the file for future binary instrumentation. The flag "_binprof_flag" 112 is an example of a data variable, the value of which indicates whether the binary file has been instrumented.

In one embodiment, a binary file that is prepared for instrumentation according to the techniques described herein does not include any annotation information. In another embodiment, the binary file prepared for instrumentation according to the techniques described herein includes accurate annotation information that at least indicates the boundaries of the different portions of the computer program represented by the binary file. In addition, the annotation information included in the binary file may also include annotation information having any of the annotation information types described herein. FIG. 1B illustrates a binary file according to this latter embodiment.

Binary file 100 depicted in FIG. 1B is prepared for any subsequent binary instrumentation. Binary file 100 includes code section 102 that stores the uninstrumented executable code of the computer program represented by the file. Code section 102 is linked into binary file 100 from the object code of the computer program. Binary file 100 also includes annotation information section 104 that stores accurate annotation information that describes the structure of the computer program. Annotation information section 104 is also linked into binary file 100 from the object code of the computer program.

Binary file 100 also includes sections 108 and 110. Sections 108 and 110 include instrumentation routines that are commonly used by instrumentation code that may subsequently be inserted in code section 102. Sections 108 and 110 are linked into binary file 100 from a common object file, and the routines in sections 108 and 110 are not referenced by any instructions from the object code of the computer program. Binary file 100 also includes data section 106 that stores data variables and any other data that may be referenced by executable instructions in any of sections 102, 108, and 110. Data section 106 is generated by combining the data sections from the object code of the computer program and any data sections that are included in the common object file. For example, as depicted in FIG. 1B, data section 106 includes data variables 112 and 114 which are included in the data section from a data section of the common object file that stores the code for sections 108 and 110. Data section 106 also includes any data and data variables that are included in the data sections of the object code of the computer program.

VI. Hardware Overview

Figure 4:
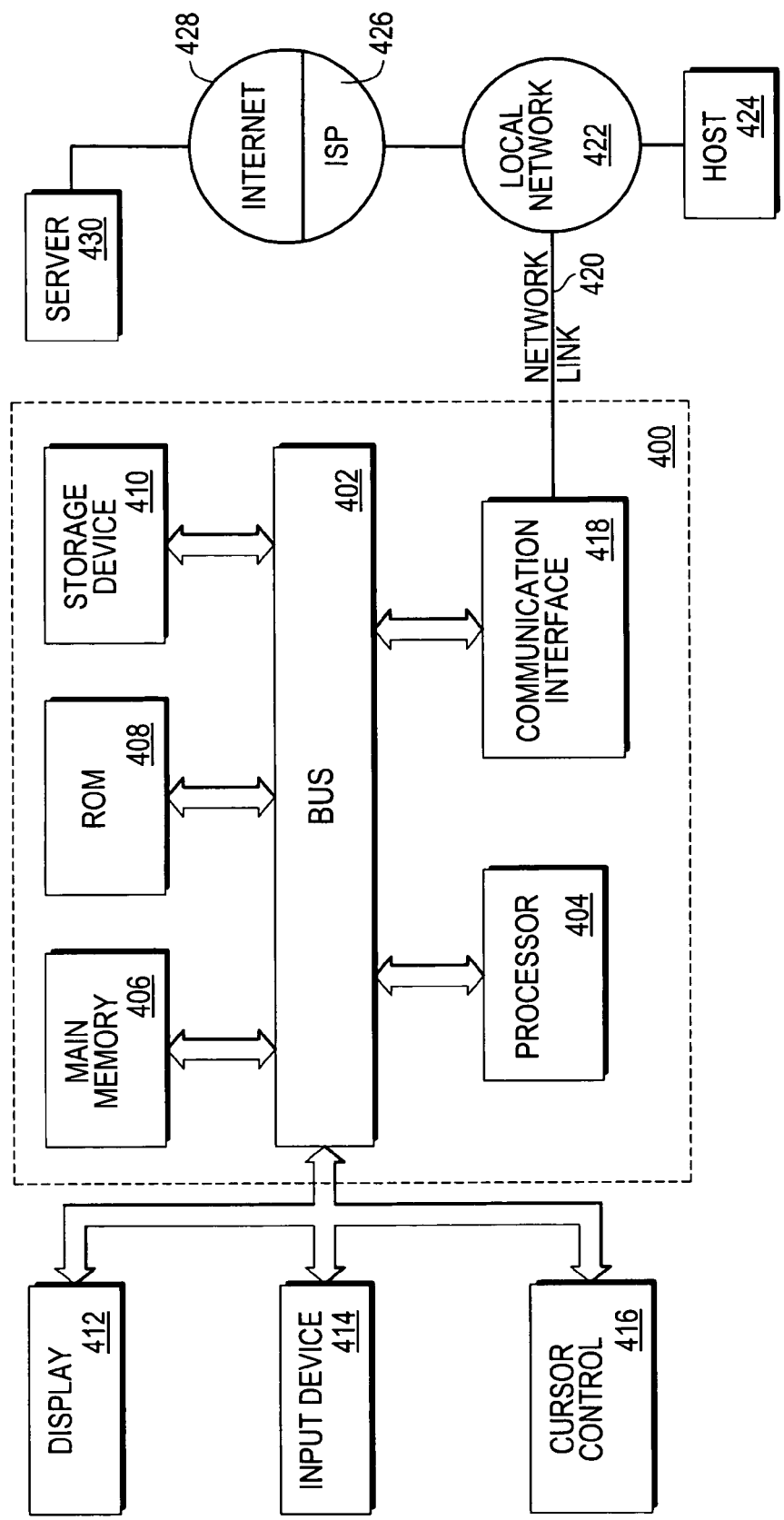
FIG. 4 is a block diagram of a general purpose computer system in which one embodiment of the present invention may be implemented.

FIG. 4 is a block diagram of a computer system 400 in which one embodiment of the present invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
accessing a binary file, wherein the binary file comprises:
a code section that represents the executable code of a computer program; and
annotation information that indicates the boundaries of one or more portions of the computer program, wherein the annotation information identifies a specific instruction, that when executed, is configured to free at least one register to obtain a free register; and
instrumenting the binary file, wherein instrumenting comprises:
inserting a set of instrumentation code at one or more points in the code section of the computer program, wherein the one or more points are determined using the annotation information; and
inserting a profile section configured to store profile information, wherein the set of instrumentation code, when executed, modifies the profile information and wherein the profile information characterizes the execution of the executable code,
wherein the free register is determined, using the annotation information, at a particular point of the one or more points in the code section of the computer program at which the set of instrumentation code is inserted; and
inserting a group of instructions that use the free register at the particular point, wherein the group of instructions are executed as part of executing the binary file.

2. The machine implemented method of claim 1, wherein:
the method further comprises generating at least one of data flow information and control flow information for the computer program based on the annotation information; and
inserting the set of instrumentation code further comprises determining the one or more points based on at least one of the data flow information and the control flow information.

3. The machine implemented method of claim 1, wherein the annotation information comprises one or more annotation records that identify the boundaries of the one or more portions of the computer program.

4. The machine implemented method of claim 3, wherein each of the one or more annotation records comprises:
a first information indicating a particular annotation type of a plurality of annotation types; and
a second information of the particular annotation type, wherein the second information describes one of the one or more portions of the computer program.

5. The machine implemented method of claim 1, wherein:
a particular portion of the one or more portions of the computer program is a function; and
the annotation information indicates the boundaries of the function.

6. The machine implemented method of claim 1, wherein:
a particular portion of the one or more portions of the computer program is a basic block of a function; and
the annotation information indicates the boundaries of the basic block within the function.

7. The machine implemented method of claim 1, wherein the one or more portions of the computer program comprise a plurality of portions, wherein:
a first portion of the plurality portions of the computer program is the code section of the computer program;
a second portion of the plurality of portions of the computer program represents data stored for the computer program in the binary file, wherein the data is referenced by the executable code of the computer program; and
the annotation information indicates the boundaries of the first portion and the second portion.

8. The machine implemented method of claim 1, wherein:
the profile information comprises one or more counters, wherein each of the one or more counters is associated with one of the one or more portions of the computer program; and
a first group of instructions, when executed as part of executing a particular portion of the one or more portions of the computer program, increments a particular counter of the one or more counters that is associated with the particular portion.

9. The machine implemented method of claim 8, wherein:
inserting the set of instrumentation code further comprises inserting a second group of instructions which is to be executed at the end of the execution of the computer program, wherein the second group of instructions, when executed, causes the profile information in the profile section to be exported to a file that is different than the binary file.

10. The machine implemented method of claim 1, wherein each of the one or more points in the code section is associated with one of the one or more portions of the computer program.

11. The machine implemented method of claim 10, wherein the one or more portions of the computer program include any one of a particular function that is included in the executable code of the computer program and a basic block that is included in the executable code of the computer program.

12. The machine implemented method of claim 1, wherein:
after being executed, the specific instruction causes each of the set of one or more free registers to hold a value that is not used in the execution of any code that follows the specific instruction in the executable code of the computer program; and
inserting the group of instructions further comprises inserting the group of instructions immediately after the specific instruction.

13. The machine implemented method of claim 1, wherein:
the method further comprises generating at least one of data flow information and control flow information for the computer program based on the annotation information; and
determining the free register based on the annotation information further comprises determining the free register based at least on one of the data flow information and the control flow information.

14. The machine implemented method of claim 1, further comprising:
analyzing the computer program based on the profile information, wherein the set of instrumentation code, when executed as part of executing the binary file, generates the profile information.

15. A machine readable storage device, comprising:
instructions for causing one or more processors to access a binary file, wherein the binary file comprises:
a code section that represents the executable code of a computer program; and
annotation information that indicates the boundaries of one or more portions of the computer program, wherein the annotation information identifies a specific instruction, that when executed, is configured to free at least one register to obtain a free register; and
instructions for causing one or more processors to instrument the binary file, wherein instrumenting comprises:
inserting a set of instrumentation code at one or more points in the code section of the computer program, wherein the one or more points are determined using the annotation information; and inserting a profile section configured to store profile information, wherein the set of instrumentation code, when executed, modifies the profile information and wherein the profile information characterizes the execution of the executable code, wherein the free register is determined, using the annotation information, at a particular point of the one or more points in the code section of the computer program at which the set of instrumentation code is inserted; and inserting a group of instructions that use the free register at the particular point, wherein the group of instructions are executed as part of executing the binary file.

16. The machine readable storage device of claim 15, wherein:

the machine readable medium further comprises instructions for causing one or more processors to generate at least one of data flow information and control flow information for the computer program based on the annotation information; and the instructions for causing one or more processors to insert the set of instrumentation code further comprise instructions for causing one or more processors to determine the one or more points based on at least one of the data flow information and the control flow information.

17. The machine readable storage device of claim 15, wherein the annotation information comprises one or more annotation records that identify the boundaries of the one or more portions of the computer program.

18. The machine readable storage device of claim 17, wherein each of the one or more annotation records comprises:

a first information indicating a particular annotation type of a plurality of annotation types; and a second information of the particular annotation type, wherein the second information describes one of the one or more portions of the computer program.

19. The machine readable storage device of claim 15, wherein:

a particular portion of the one or more portions of the computer program is a function; and the annotation information indicates the boundaries of the function.

20. The machine readable storage device of claim 15, wherein:

a particular portion of the one or more portions of the computer program is a basic block of a function; and the annotation information indicates the boundaries of the basic block within the function.

21. The machine readable storage device of claim 15, wherein the one or more portions of the computer program comprise a plurality of portions, wherein:

a first portion of the plurality portions of the computer program is the code section of the computer program;

a second portion of the plurality of portions of the computer program represents data stored for the computer program in the binary file, wherein the data is referenced by the executable code of the computer program; and the annotation information indicates the boundaries of the first portion and the second portion.

22. The machine readable storage device of claim 15, wherein:

the profile information comprises one or more counters, wherein each of the one or more counters is associated with one of the one or more portions of the computer program; and a first group of instructions, when executed as part of executing a particular portion of the one or more portions of the computer program, increments a particular counter of the one or more counters that is associated with the particular portion.

23. The machine readable storage device of claim 22, wherein:

the instructions for causing one or more processors to insert the set of instrumentation code further comprise instructions for causing one or more processors to insert a second group of instructions which is to be executed at the end of the execution of the computer program, wherein the second group of instructions, when executed, causes the profile information in the profile section to be exported to a file that is different than the binary file.

24. The machine readable storage device of claim 15, wherein each of the one or more points in the code section is associated with one of the one or more portions of the computer program.

25. The machine readable storage device of claim 24, wherein the one or more portions of the computer program include any one of a particular function that is included in the executable code of the computer program and a basic block that is included in the executable code of the computer program.

26. The machine readable storage device of claim 15, wherein:

after being executed, the specific instruction causes each of the set of one or more free registers to hold a value that is not used in the execution of any code that follows the specific instruction in the executable code of the computer program; and the instructions for causing one or more processors to insert the group of instructions further comprise instructions for causing one or more processors to insert the group of instructions immediately after the specific instruction.

27. The machine readable storage device of claim 15, wherein:

the machine readable storage device further comprises instructions for causing one or more processors to generate at least one of data flow information and control flow information for the computer program based on the annotation information; and the instructions for causing one or more processors to determine the free register based on the annotation information further comprise instructions for causing one or more processors to determine the free register based at least on one of the data flow information and the control flow information.

28. The machine readable storage device of claim 15, further comprising:

instructions for causing one or more processors to analyze the computer program based on profile information, wherein the set of instrumentation code, when executed as part of executing the binary file, generates the profile information.

* * * * *